(12) United States Patent
Mori et al.

(10) Patent No.: US 11,997,239 B2
(45) Date of Patent: May 28, 2024

(54) PRINTING APPARATUS

(71) Applicant: SEIKO EPSON CORPORATION, Tokyo (JP)

(72) Inventors: Takuto Mori, Nagano (JP); Katsuo Takeuchi, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/652,698

(22) Filed: Feb. 28, 2022

(65) Prior Publication Data
US 2022/0279084 A1    Sep. 1, 2022

(30) Foreign Application Priority Data
Mar. 1, 2021 (JP) ................. 2021-031756

(51) Int. Cl.
*H04N 1/00* (2006.01)
*G06F 1/26* (2006.01)

(52) U.S. Cl.
CPC ......... *H04N 1/00907* (2013.01); *G06F 1/263* (2013.01); *G06F 1/266* (2013.01); *H04N 1/00901* (2013.01)

(58) Field of Classification Search
CPC ........... H04N 1/00907; H04N 1/00901; G06F 1/263; G06F 1/266; G06F 3/1236; B41J 2/01; B41J 2/32; B41J 2/435; B41J 3/44; B41J 3/46; B41J 29/38; B41J 29/393
See application file for complete search history.

(56) References Cited

U.S. PATENT DOCUMENTS

| | | | |
|---|---|---|---|
| 11,599,180 B1 * | 3/2023 | Cooper | G06F 1/3265 |
| 2005/0200703 A1 | 9/2005 | Kobayashi et al. | |
| 2014/0240736 A1 | 8/2014 | Tsongas et al. | |
| | (Continued) | | |

FOREIGN PATENT DOCUMENTS

| | | |
|---|---|---|
| JP | 2019-047592 A | 3/2019 |
| JP | 2020-052959 A | 4/2020 |

OTHER PUBLICATIONS

USB Promoter Group. "Excerpts." Universal Serial Bus Type-C Cable and Connector Specification, USB Promotion Group, 2019. (Year: 2019).*

*Primary Examiner* — Jaweed A Abbaszadeh
*Assistant Examiner* — Brian J Corcoran
(74) *Attorney, Agent, or Firm* — Global IP Counselors, LLP

(57) ABSTRACT

A printing apparatus includes a printing section performing printing, and a USB-Type-C interface configured to perform switching to a first state in which a printing operation is executed or a second state in which the power is supplied to the external device. The USB-Type-C interface includes a state identification terminal held at a first potential indicating that the USB-Type-C interface is coupled in the first state or a second potential indicating that the USB-Type-C interface is coupled in the second state. The state identification terminal is periodically switched between the first potential and the second potential during a unit time when the external device is not coupled to the USB-Type-C interface, and in the unit time, a time at which the state identification terminal is held at the second potential is longer than a time at which the state identification terminal is held at the first potential.

10 Claims, 13 Drawing Sheets

(56) References Cited

U.S. PATENT DOCUMENTS

| | | | |
|---|---|---|---|
| 2016/0267367 A1* | 9/2016 | Uno | B41J 3/44 |
| 2018/0060261 A1* | 3/2018 | Chhor | G06F 13/4282 |
| 2018/0089123 A1* | 3/2018 | Kulkarni | G06F 13/4072 |
| 2018/0285038 A1 | 10/2018 | Shimamura et al. | |
| 2019/0369708 A1* | 12/2019 | K | G06F 1/266 |
| 2019/0372375 A1* | 12/2019 | Kayama | H02J 7/342 |
| 2021/0313819 A1* | 10/2021 | Hattori | H02J 7/0047 |

* cited by examiner

PRINTING APPARATUS

The present application is based on, and claims priority from JP Application Serial Number 2021-031756, filed Mar. 1, 2021, the disclosure of which is hereby incorporated by reference herein in its entirety.

BACKGROUND

1. Technical Field

The present disclosure relates to a printing apparatus.

2. Related Art

A host device and a device coupled via a universal serial bus (USB) Type-C cable in compliance with a USB-Type-C standard may be provided (for example, see JP-A-2020-52959). The USB-Type-C cable includes a configuration channel (CC) line.

A USB-Type-C interface to which the USB-Type-C cable is connected has a dual role port (DRP) that can be both a downstream facing port (DFP), which is a port on a side functioning as a host and supplying power, and an upstream facing port (UFP), which is a port on a side functioning as a device and receiving power. However, the USB-Type-C interface according to the related art does not have a DRP setting suitable for a printing apparatus.

SUMMARY

According to the present disclosure, a printing apparatus includes a printing section performing printing on a medium, a power supply circuit supplying power to the printing section, a control circuit controlling the printing section and the power supply circuit, and a USB-Type-C interface configured to couple an external device and perform switching to a first state in which a printing operation is executed by the printing section in response to a request from the external device or a second state in which the power is supplied from the power supply circuit to the external device. The USB-Type-C interface includes a state identification terminal held at a first potential indicating that the USB-Type-C interface is coupled in the first state or a second potential indicating that the USB-Type-C interface is coupled in the second state. The state identification terminal is periodically switched between the first potential and the second potential during a unit time when the external device is not coupled to the USB-Type-C interface, and during the unit time, a time at which the state identification terminal is held at the second potential is longer than a time at which the state identification terminal is held at the first potential.

DESCRIPTION OF EXEMPLARY EMBODIMENTS

Hereinafter, embodiments for carrying out the present disclosure will be described with reference to the drawings. However, a dimension and a scale of each part are different from actual ones as appropriate in each drawing. The embodiments described below are preferred specific examples of the present disclosure and are thus added with technically preferred various limitations, but the scope of the present disclosure is not limited to such embodiments unless description for limiting the present disclosure is made in the following description.

Figure 1:
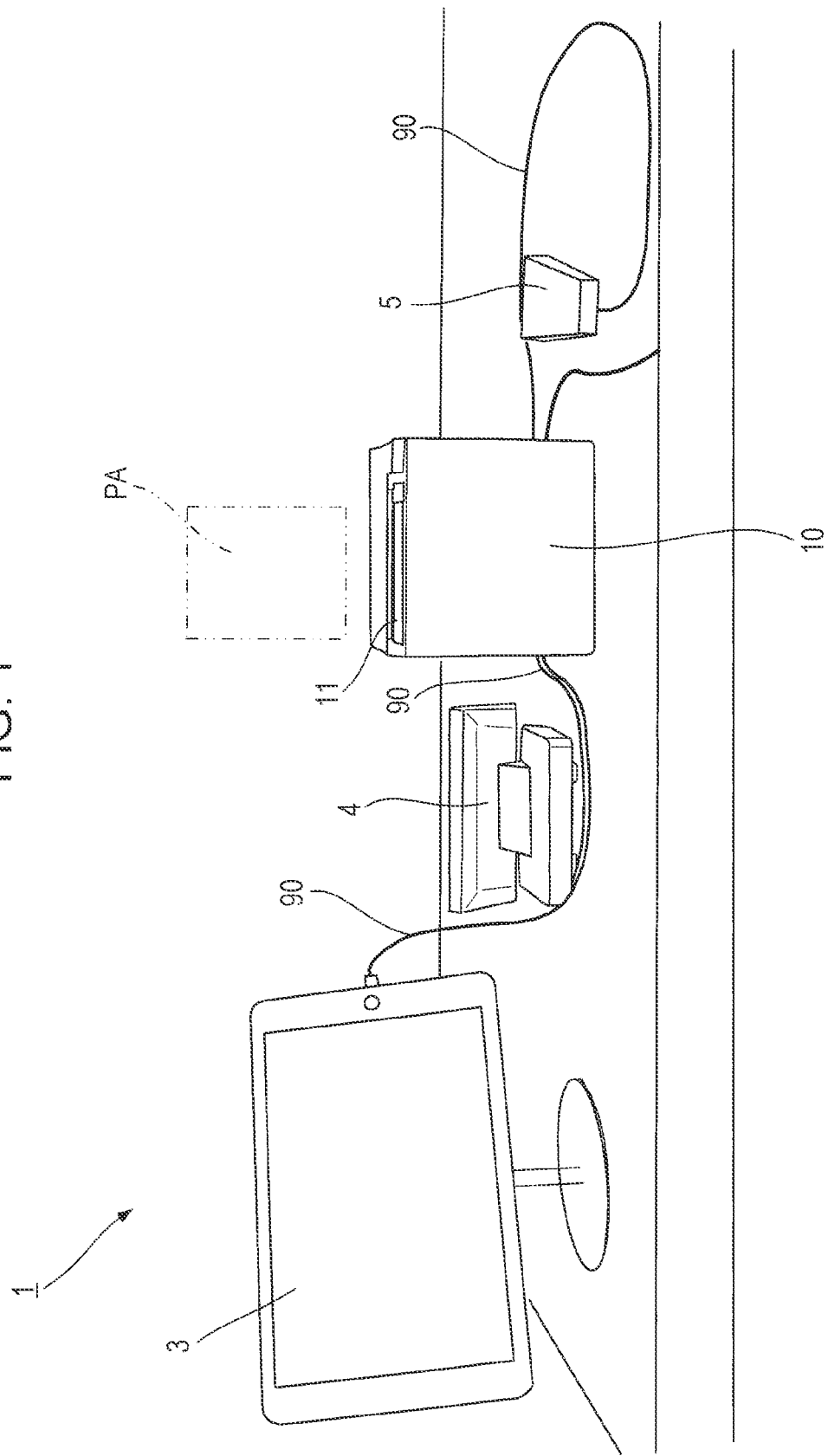
FIG. 1 is a schematic view illustrating a POS system according to a first embodiment.
Figure 2:
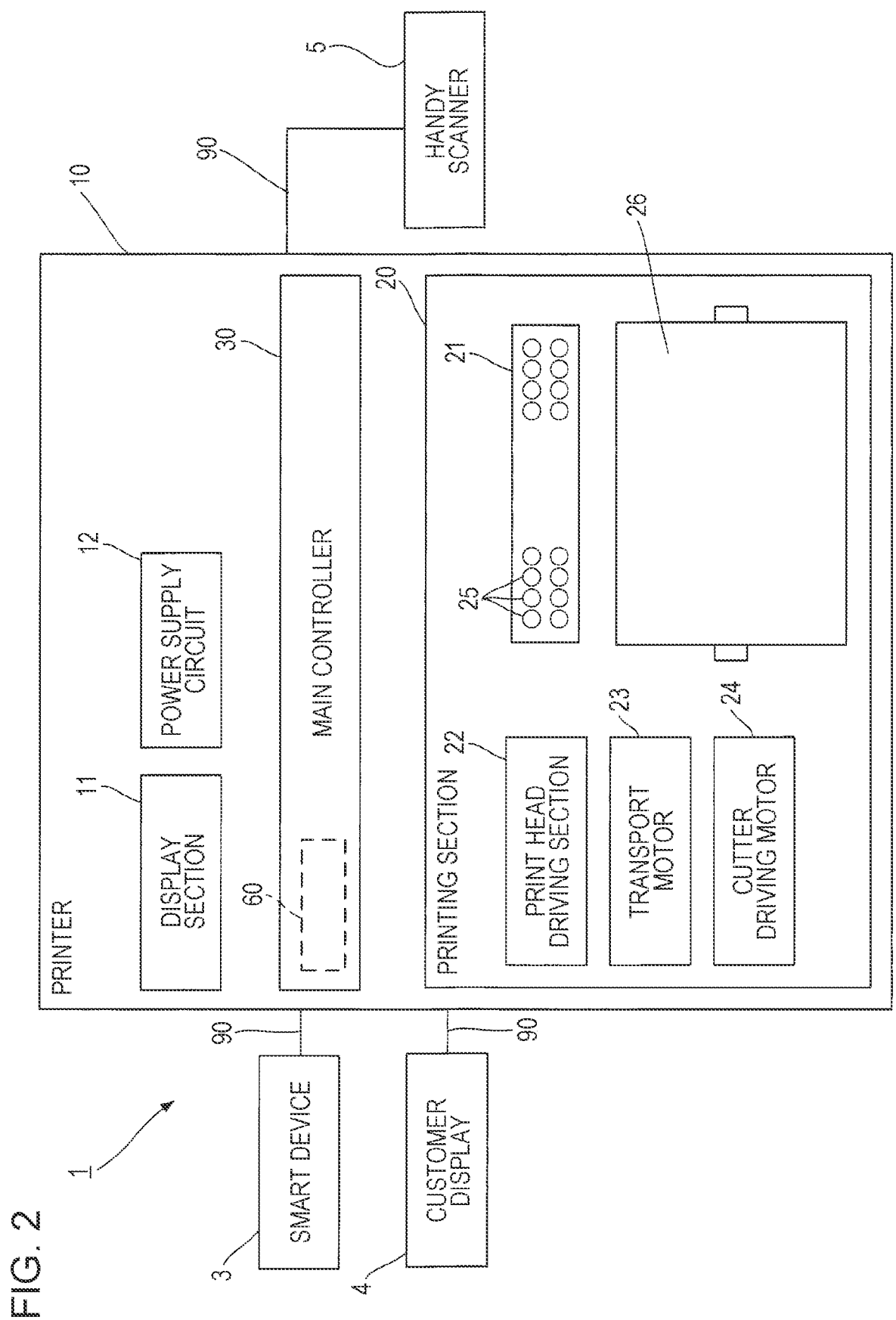
FIG. 2 is a block diagram illustrating the POS system.

FIG. 1 is a schematic view illustrating a POS system 1 according to a first embodiment. FIG. 2 is a block diagram illustrating the POS system 1. The POS system 1 illustrated in FIGS. 1 and 2 is used in a store, for example, and has a function of accounting for goods or services purchased by a customer and a function of issuing a receipt according to the accounting.

The POS system 1 includes a printer 10, a smart device 3, a customer display 4, and a handy scanner 5.

The smart device 3 is an example of an external device. The smart device 3 is a terminal that can be carried by a user. The smart device 3 is, for example, a tablet terminal or a smartphone. The smart device 3 includes a communication section (not illustrated) that communicates data according to a predetermined communication standard. The smart device 3 communicates with the printer 10 via the communication section. The smart device 3 can be coupled to the printer 10 via a USB interface, as will be described later. The smart device 3 can communicate with the printer 10 using wireless communication.

The smart device 3 includes a battery, and can be operated with power charged in the battery. The smart device 3 can charge the battery with power supplied from the printer 10 as will be described later. The smart device 3 is installed with an application for creating print data. The smart device 3 is installed with an application for POS.

The smart device 3 transmits a control-related command and a printing-related command to the printer 10 using a user's instruction or the like as a trigger. When these commands are received, the printer 10 stores the commands in a reception buffer to be described later. The control-related command includes, for example, a setting command for instructing format setting and a status request command for instructing a request for information indicating a state of the printer 10. The printing-related command includes, for example, a print command for instructing printing, a line feed command for instructing a line feed, a new line command for instructing a new line, a cutter command for instructing cutting of a medium, and the like. The printing-related command includes a command corresponding to a drive instruction for any one of a thermal head 21, a transport motor 23, and a cutter driving motor 24, which will be described later.

The smart device 3 uses the user's instruction or the like as a trigger to generate print data such as characters and images printed by the printer 10. The smart device 3 transmits a print command including the generated print data to the printer 10 according to a predetermined communication standard. The printer 10 executes a print command and prints characters, images, and the like on a medium based on the print data.

The customer display 4 is an example of an external device. The customer display 4 can be used, for example, by being placed on a counter table in the store. A customer who purchases goods at the store can visually recognize a price displayed on the customer display 4 and recognize a payment amount.

The customer display 4 is electrically coupled to the printer 10. The customer display 4 operates with the power supplied from the printer 10. The customer display 4 displays the price based on information output from the printer 10.

The handy scanner 5 is an example of an external device. The handy scanner 5 is electrically coupled to the printer 10. The handy scanner 5 operates with the power supplied from the printer 10. The printer 10 inputs information on an image scanned by the handy scanner 5. For example, a clerk who is a user scans a barcode attached to the goods using the handy scanner 5. Information on the scanned image is output to the smart device 3 via the printer 10. The smart device 3 can acquire information on the goods and information on the price.

The printer 10 is, for example, a thermal printer. The printer 10 includes a display section 11, a power supply circuit 12, a printing section 20, and a main controller 30.

The display section 11 is, for example, a liquid crystal display device. As illustrated in FIG. 2, the display section 11 is electrically coupled to the main controller 30 and is controlled by the main controller 30. The display section 11 displays, for example, information on a state of the printer 10. The display section 11 may display, for example, information on the communication state, information for prompting replenishment of thermal roll paper, and the like.

The power supply circuit 12 can supply power to the display section 11, the printing section 20, and the main controller 30. The power supply circuit 12 can be coupled to, for example, a commercial AC power supply, convert the power supplied from the commercial AC power supply into appropriate power, and supply the power to each section. The power supply circuit 12 includes, for example, a DC-DC converter, a resistance element, a switching element, a transistor, and the like. The power supply circuit 12 can supply the power to an external device electrically coupled to the printer 10, as will be described later. Examples of the external device include the smart device 3, the customer display 4, the handy scanner 5, and the like.

The printing section 20 includes the thermal head 21, a print head driving section 22, the transport motor 23, and the cutter driving motor 24. The printing section 20 has a transport roller (not illustrated) and a cutter. The cutter includes a fixed blade and a movable blade. The thermal head 21, the print head driving section 22, and the transport motor 23 are electrically coupled to the power supply circuit 12, and operate with the power supplied from the power supply circuit 12. The printing section 20 is controlled by the main controller 30. The printing section 20 executes printing based on the print data output from the smart device 3.

The thermal head 21 has many heat generating elements 25. The many heat generating elements 25 are arranged in a direction orthogonal to a transport direction of thermal roll paper 26 which is a medium PA. The heat generating element 25 is energized to apply heat to the printed surface of the thermal roll paper 26. As a result, the thermal head 21 can print characters, images, and the like on the thermal roll paper.

The print head driving section 22 is controlled by the main controller 30 to control the energization of the thermal head 21 to the heat generating element 25. The transport motor 23 is controlled by the main controller 30 to rotate the transport roller and transfer the thermal roll paper 26. The cutter driving motor 24 is controlled by the main controller 30 and drives the movable blade so as to slide toward the fixed blade and cut the thermal roll paper.

Figure 3:
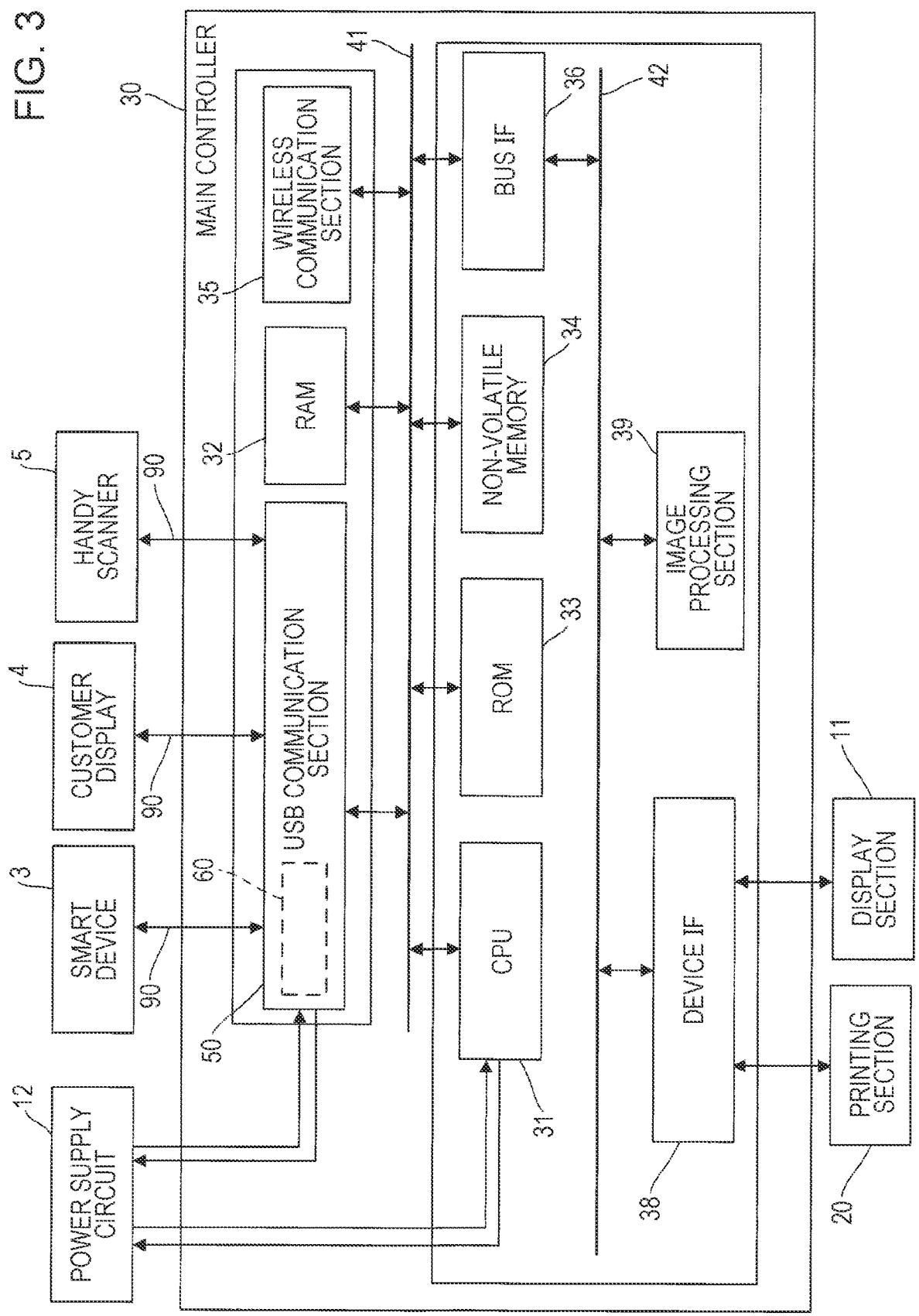
FIG. 3 is a block diagram illustrating a main controller of a printer.

FIG. 3 is a block diagram illustrating the main controller 30 of the printer 10. As illustrated in FIG. 3, the main controller 30 includes a CPU 31, a RAM 32, a ROM 33, a non-volatile memory 34, a wireless communication section 35, a USB communication section 50, and a BUS IF 36. The main controller 30 includes a device IF 38 and an image processing section 39. The CPU 31 is an example of a control circuit. Although the CPU is illustrated as an example of the control circuit, the control circuit may include hardware such as FPGA in place of or in addition to the CPU. The FPGA is an abbreviation for field programmable gate array.

The CPU 31 controls the main control of the printer 10. The CPU 31 is electrically coupled to the RAM 32, the ROM 33, the non-volatile memory 34, the wireless communication section 35, the USB communication section 50, and the BUS IF 36 via a system bus 41.

The RAM 32 is a memory that enables reading and writing at any time to provide a work area of the CPU 31. The RAM 32 can also be used as an image memory for temporarily storing image data. The ROM 33 is a boot ROM and stores a system boot program. The non-volatile memory 34 stores system software, set value data, and the like that need to be retained even after the power of the printer 10 is cut off.

The wireless communication section 35 can be coupled to an external device by using wireless communication. The wireless communication section 35 can communicate with an external device according to standards such as Wi-Fi (registered trademark) and Bluetooth (registered trademark). The BUS IF 36 is an interface that is electrically coupled to the system bus 41 and an image bus 42. The BUS IF 36 can operate as a bus bridge that transforms a data structure.

In addition to the BUS IF 36, the device IF 38 and the image processing section 39 are electrically coupled to the image bus 42. The device IF 38 is an interface for coupling the main controller 30, the printing section 20, and the display section 11. The device IF 38 can perform data synchronous/asynchronous conversion. The image processing section 39 can perform predetermined processing on data related to printing output to the printing section 20.

Figure 4:
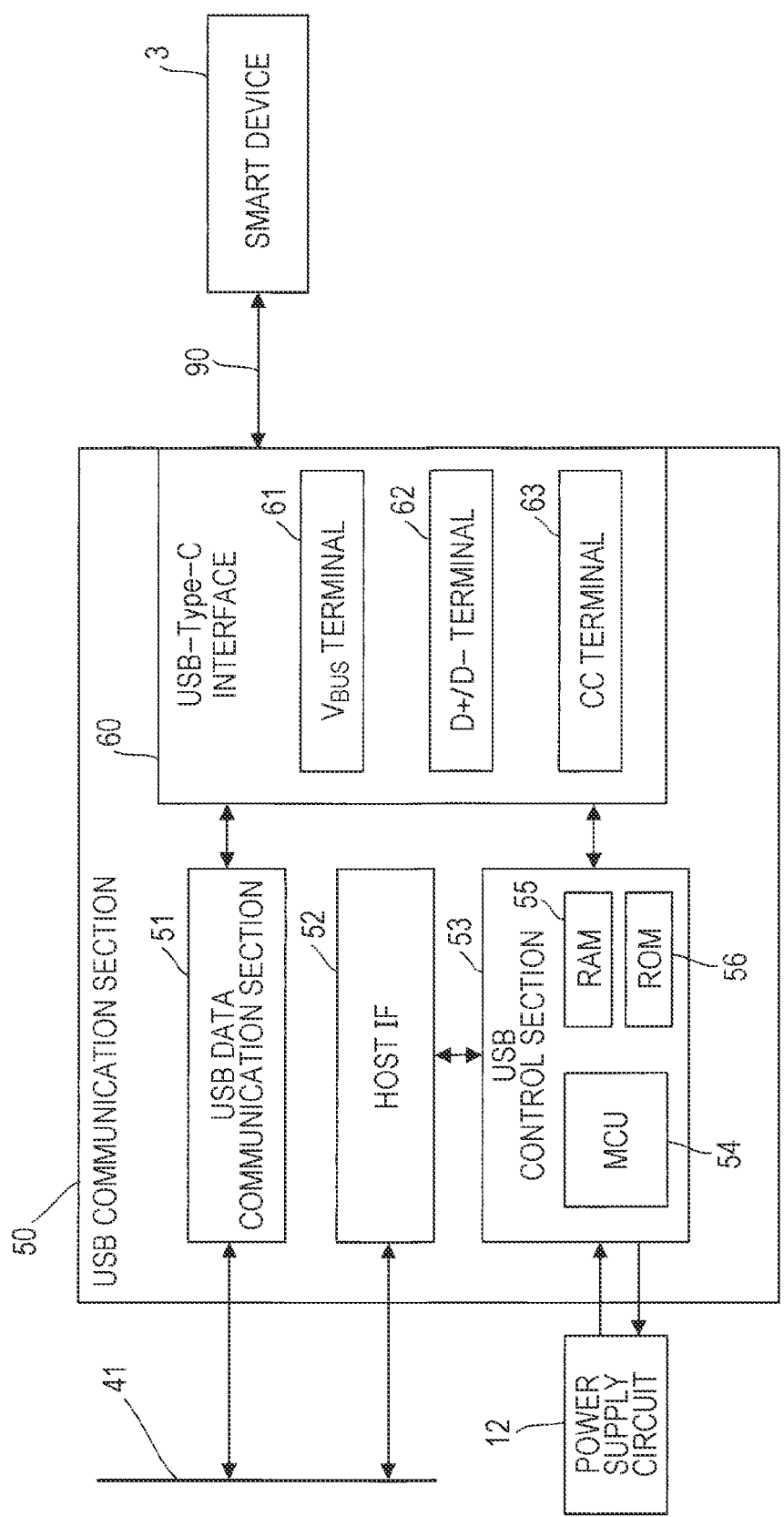
FIG. 4 is a block diagram illustrating a USB communication section.

FIG. 4 is a block diagram illustrating the USB communication section 50. As illustrated in FIG. 4, the USB communication section 50 includes a USB-Type-C interface 60, a USB data communication section 51, a host IF 52, and a USB control section 53.

The USB data communication section 51 performs data transmission/reception control and communication protocol control. The USB data communication section 51 can control data reception from an external device such as the smart device 3 coupled to a USB. The USB data communication section 51 can perform data transmission control for transmitting data such as the printing-related command to the system bus 41.

The host IF 52 is a communication interface with the CPU 31. The host IF 52 mediates mutual communication between the CPU 31 and the USB control section 53, for example, in synchronous serial communication or the like. The synchronous serial communication may be, for example, inter-integrated circuit (I2C) communication.

The USB control section 53 can execute processing in the USB communication section 50 based on a control instruction received via the host IF 52. The USB control section 53 may include a micro control unit (MCU) 54, the RAM 55, and the ROM 56.

The RAM 55 can retain power profile setting information indicating an amount of power that can be supplied by the printer 10. The MCU 54 can perform step-up processing or step-down processing on the power supplied from the power supply circuit 12 based on the power profile setting information using a regulator (not illustrated). As a result, the printer 10 can supply a desired amount of power to the external device via a $V_{BUS}$ terminal 61 to be described later.

The USB control section 53 can detect the printing-related command transmitted from the external device during sleeping of the printer 10. The USB control section 53 can notify the CPU 31 of the detection of the printing-related command and change the state of the printer 10.

The printer 10 may include a plurality of USB-Type-C interfaces 60. A USB-Type-C cable 90 is coupled to the USB-Type-C interface 60. The smart device 3, which is the external device, is coupled to the USB-Type-C interface 60 via the USB-Type-C cable 90.

The USB-Type-C interface 60 includes a $V_{BUS}$ terminal 61, a D+/D− terminal 62, and a configuration channel (CC) terminal 63. The $V_{BUS}$ terminal 61 is an example of a power input/output terminal. The $V_{BUS}$ terminal 61 can receive power from the external device. The $V_{BUS}$ terminal 61 can transmit a data signal to the external device. The D+/D− terminal 62 is an example of a data transmission/reception terminal. The D+/D− terminal 62 can receive the data signal from the external device. The data transmission/reception terminal can transmit the data signal to the external device.

The CC terminal 63 is an example of a state identification terminal. The CC terminal 63 can identify a state of whether the D+/D− terminal 62 can receive the data signal from the external device or whether the D+/D− terminal 62 can transmit the data signal to the external device. The CC terminal 63 can identify a state of whether the $V_{BUS}$ terminal 61 can receive the power from the external device or the $V_{BUS}$ terminal 61 can supply the power to the external device.

Figure 5:
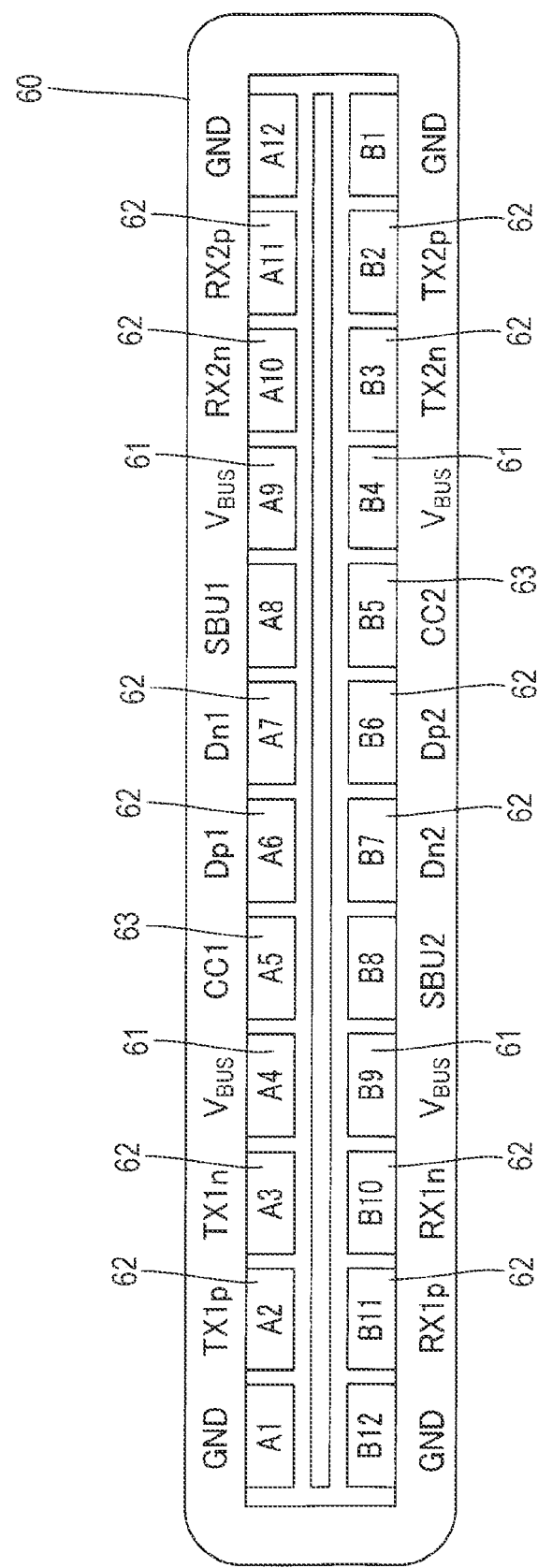
FIG. 5 is a schematic view illustrating an arrangement of terminals of a USB-Type-C interface.

FIG. 5 is a schematic view illustrating an arrangement of terminals of the USB-Type-C interface 60. The USB-Type-C interface 60 illustrated in FIG. 5 includes terminals A1 to A12 in a first row and terminals B1 to B12 in a second row. The terminals A1 to A12 and terminals B1 to B12 conform to the USB-Type-C standard.

The terminals A2, A3, A10, and A11 and the terminals B2, B3, B10, and B11 are included in the D+/D− terminal 62, and terminals supporting high-speed data communication. The high-speed data communication may be, for example, high-speed data communication by USB 3.1. The terminals A6 and A7 and the terminals B6 and B7 are included in the D+/D− terminal 62, and terminals supporting low-speed data communication. The low-speed data communication may be, for example, low-speed data communication by USB 2.0.

The terminals A4 and A9 and the terminals B4 and B9 are the $V_{BUS}$ terminals 61 and power supply terminals. The terminals A1 and A12 and the terminals B1 and B12 are GND terminals, and terminals transmitting a ground voltage. The terminal A8 and the terminal B8 are sideband use (SBU) terminals. The terminals A8 and B8 are terminals used for ALT mode support, and are coupled to a cable installed with Thunderbolt (registered trademark), DisplayPort, HDMI (registered trademark), and the like.

The terminal A5 and the terminal B5 are the CC terminals 63. Devices installed with the USB-Type-C interface 60 in compliance with the USB-Type-C standard can perform bidirectional communication. The USB-Type-C interface 60 can be switched to a downstream facing port (DFP) or an upstream facing port (UFP).

The USB-Type-C interface 60 can be switched between a first state and a second state. The USB-Type-C interface 60, which is in the first state, can operate as the UFP. The USB-Type-C interface 60, which is in the second state, can operate as the DFP. When the USB-Type-C interface 60 is in the first state, it can operate as a sink. When the USB-Type-C interface 60 is in the second state, it can operate as a source.

When the USB-Type-C interface 60 is in the first state, the printer 10 can cause the printing section 20 to perform a printing operation in response to a request from the smart device 3. The printing-related command output from the smart device 3 coupled via the USB-Type-C interface 60 is transmitted to the CPU 31. The CPU 31 can output a command signal to the printing section 20 to perform the printing operation.

Figure 6:
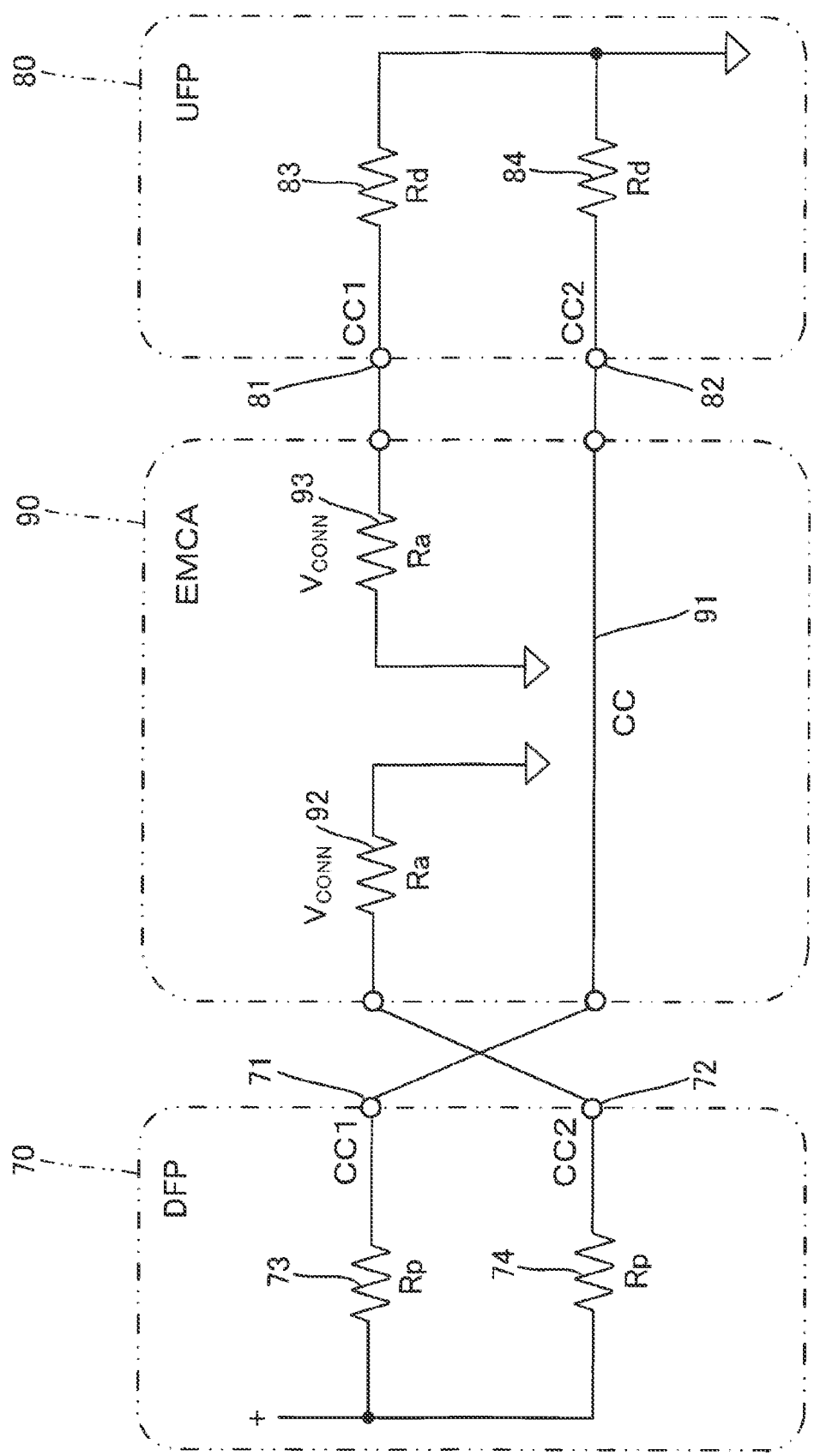
FIG. 6 is a circuit diagram illustrating electrical coupling between a DFP and a UFP.

FIG. 6 is a circuit diagram illustrating electrical coupling between a USB-Type-C interface operating as a DFP 70 and a USB-Type-C interface operating as a UFP 80. FIG. 6 illustrates only coupling of the CC terminal. When the USB-Type-C interface 60 of the printer 10 operates as the DFP 70, the USB-Type-C interface of the external device to be coupled operates as the UFP 80. When the USB-Type-C interface 60 of the printer 10 operates as the UFP 80, the USB-Type-C interface of the external device to be coupled operates as the DFP 70. The USB-Type-C interface operating as the DFP 70 is referred to as the DFP 70. The USB-Type-C interface operating as the UFP 80 is referred to the UFP 80.

The DFP 70 and UFP 80 are coupled to each other via a USB-Type-C cable 90. The DFP 70 has a CC1 terminal 71 and a CC2 terminal 72 as a CC terminal. A resistance element 73 is coupled to the CC1 terminal 71, and a resistance element 74 is coupled to the CC2 terminal 72. The resistance elements 73 and 74 are pull-up resistors Rp.

The UFP 80 has a CC1 terminal 81 and a CC2 terminal 82 as a CC terminal. A resistance element 83 is coupled to the CC1 terminal 81, and a resistance element 84 is coupled to the CC2 terminal 82. The resistance elements 83 and 84 are pull-down resistors Rd. When the printer 10 is the DFP 70, the CC1 terminal 71 and the CC2 terminal 72 are included in the CC terminal 63. When the printer 10 is the UFP 80, the CC1 terminal 81 and the CC2 terminal 82 are included in the CC terminal 63.

The USB-Type-C cable 90 includes a CC line 91 coupled to the CC terminal. The USB-Type-C cable 90 has a resistance element 92 coupled to the CC terminal of the DFP 70 and a resistance element 93 coupled to the CC terminal of the UFP 80. The resistance elements 92 and 93 are resistors Ra.

In a state in which the DFP 70 and the UFP 80 are not coupled to each other, the CC1 terminal 71 and the CC2 terminal 72 of the DFP 70 are regarded as having, for example, a second potential E2 by the resistance element 73 and the resistance element 74, respectively. The second potential E2 is, for example, 5 V.

In a state in which the DFP 70 and the UFP 80 are not coupled to each other, the CC1 terminal 81 and the CC2 terminal 82 of the UFP 80 are regarded as having, for example, a first potential E1 by the resistance element 83 and the resistance element 84, respectively. The first potential E1 is, for example, 0 V.

When the DFP 70 and the UFP 80 are coupled via the USB-Type-C cable 90, the CC1 terminal 71 of the DFP 70 is coupled to the CC2 terminal 82 of the UFP 80 via the CC line 91. The CC1 terminal 71 of the DFP 70 is set to a constant voltage by resistance division between the resistance element 73 and the resistance element 84. For example, the CC1 terminal 71 is held at a third potential E3.

When the DFP 70 and the UFP 80 are coupled via the USB-Type-C cable 90, the CC2 terminal 72 of the DFP 70 is coupled to the resistance element 92 of the USB-Type-C cable 90. The CC2 terminal 72 is set to a constant voltage by resistance division between the resistance element 74 and the resistance element 92. At this time, the voltage can be defined by the specifications of USB-Type-C, for example, and defined according to a current value corresponding thereto.

When the DFP 70 and the UFP 80 are coupled via the USB-Type-C cable 90, the CC1 terminal 81 of the UFP 80 is coupled to the resistance element 93 of the USB-Type-C cable 90.

The DFP 70 can treat a signal transmitted through the CC line 91 coupling the pull-up resistor Rp and the pull-down resistor Rd as a CC signal. The DFP 70 can treat a line coupling the pull-up resistor Rp and the resistor Ra as $V_{CONN}$. At this time, the voltage supplied to the USB-Type-C cable 90 can be defined by, for example, the specification of the USB-Type-C.

The DFP 70 can detect the UFP 80 coupled via the USB-Type-C cable 90 due to the presence of the resistance element 84. The DFP 70 changes the $V_{BUS}$ terminal 61 to be turned on and supplies 5 V. The UFP 80 detects the presence of the resistance element 73 and the power supplied via the $V_{BUS}$ terminal, and establishes coupling of the DFP 70.

When the external device is not coupled to the USB-Type-C interface 60, the CC terminal 63 is periodically and alternately switched between the first potential E1 and the second potential E2. When the external device coupled to the USB-Type-C interface 60 is detected, the CC terminal 63 is held at the third potential E3. The third potential E3 is a potential different from the first potential E1 and the second potential E2. The third potential E3 may be an intermediate potential between the first potential E1 and the second potential E2.

The first potential E1 is a signal indicating that the USB-Type-C interface 60 is coupled in the first state. The second potential E2 is a signal indicating that the USB-Type-C interface 60 is coupled in the second state.

When the DFP 70 is coupled to the USB-Type-C interface 60 in a case in which the CC terminal 63 is at the first potential E1, the USB-Type-C interface 60 recognizes the external device and is coupled in the first state. In this case, the USB-Type-C interface 60 can operate as the UFP 80.

When the UFP 80 is coupled to the USB-Type-C interface 60 in a case in which the CC terminal 63 has is at first potential E1, the CC terminal 63 does not recognize the external device.

When the UFP 80 is coupled to the USB-Type-C interface 60 in a case in which the CC terminal 63 has is at second potential E2, the USB-Type-C interface 60 recognizes the external device and is coupled in the second state. In this case, the printer 10 can operate as the DFP 70.

When the DFP 70 is coupled to the USB-Type-C interface 60 in a case in which the CC terminal 63 is at the second potential E2, the CC terminal 63 does not recognize the external device.

When the external device is not coupled to the USB-Type-C interface 60, the CC terminal 63 is periodically and alternately switched between the first potential E1 and the second potential E2 during a unit time. When the external device is not coupled to the USB-Type-C interface 60 in the CC terminal 63, a time T2 at which the CC terminal 63 is held at the second potential E2 is longer than a time T1 at which the CC terminal 63 is held at the first potential E1 in the unit time. In the unit time, the time T2 at which the CC terminal 63 is held at the second potential E2 may be a continuous period or a total time of a plurality of periods. Similarly, in the unit time, the time T1 at which the CC terminal 63 is held at the first potential E1 may be a continuous period or a total time of a plurality of periods.

Figure 7:
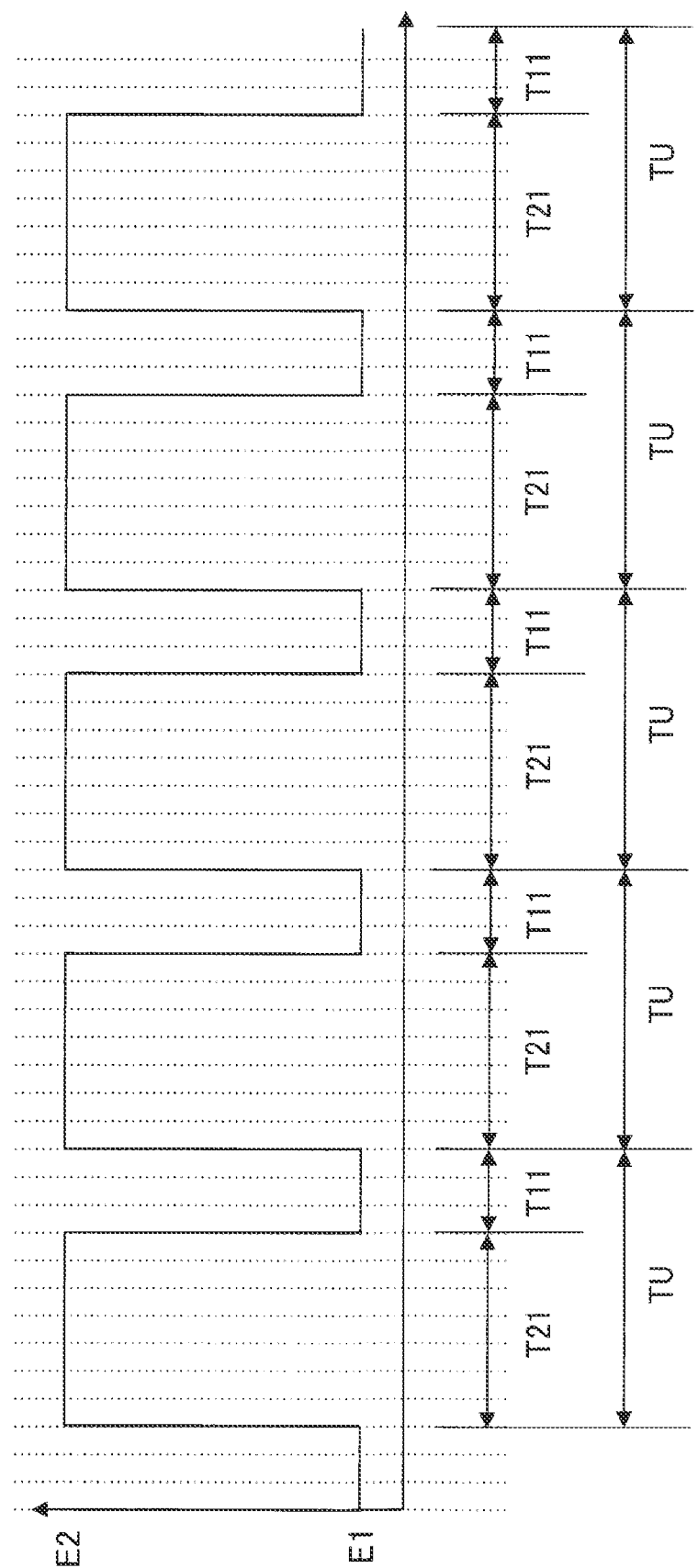
FIG. 7 is a graph illustrating switching of potentials in a CC terminal according to a first example.

FIG. 7 is a graph illustrating switching of potentials in the CC terminal 63 according to a first example. In FIG. 7, a horizontal axis represents passage of time, and a vertical axis represents a potential. In the CC terminal 63, the first potential E1 and the second potential E2 are repeated alternately. A time T21 at which the CC terminal 63 is held at the second potential E2 is 70% of a unit time TU. A time T11 at which the CC terminal 63 is held at the first potential E1 is 30% of the unit time TU.

Figure 8:
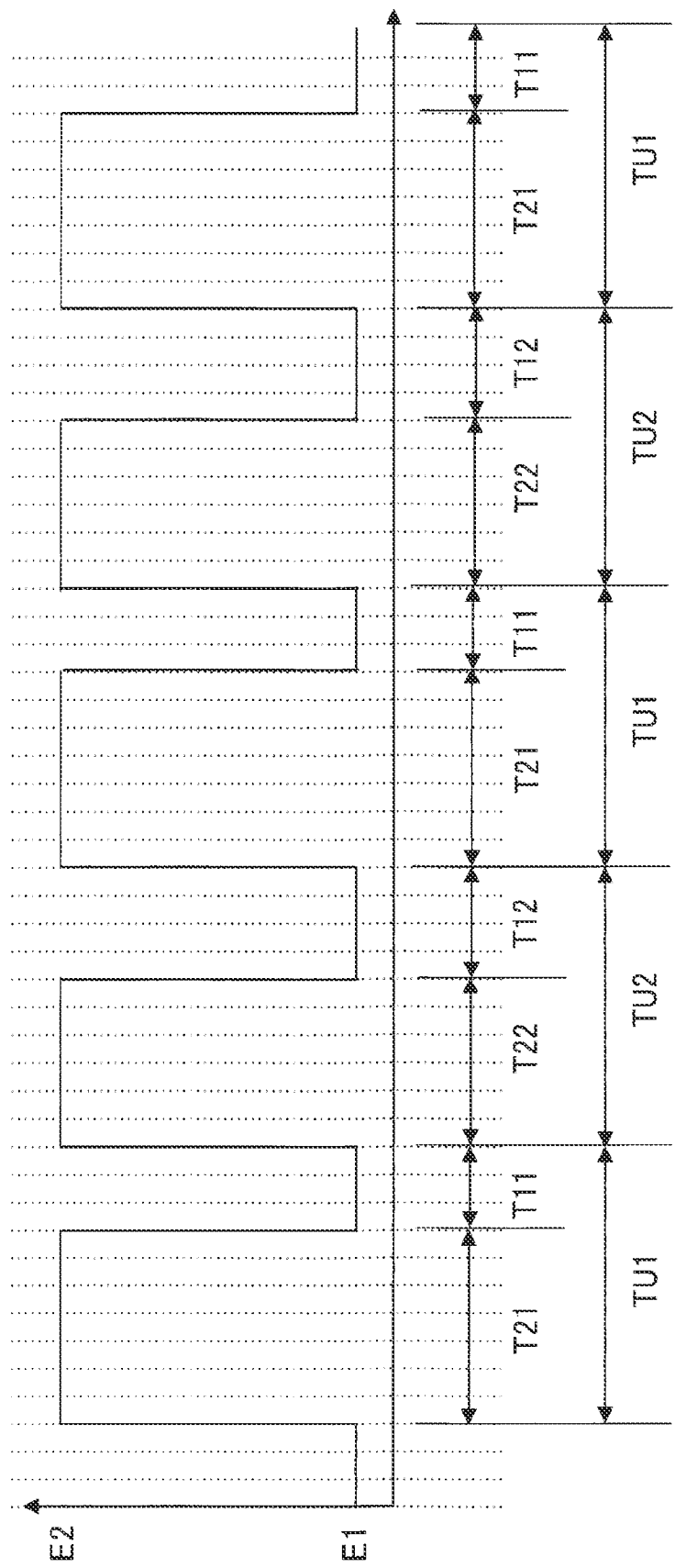
FIG. 8 is a graph illustrating switching of potentials in a CC terminal according to a second example.

FIG. 8 is a graph illustrating switching of potentials in the CC terminal 63 according to a second example. In FIG. 8, a horizontal axis represents passage of time, and a vertical axis represents a potential. In the CC terminal 63, the first potential E1 and the second potential E2 are repeated alternately. First, in a unit time TU1, the time T21 at which the CC terminal 63 is held at the second potential E2 is 70% of the time of the unit time TU1. In the unit time TU1, the time T11 at which the CC terminal 63 is held at the first potential E1 is 30% of the unit time TU1. In a unit time TU2 after the unit time TU1, a time T22 held at the second potential E2 is 60% of the unit time TU2. In the unit time TU2, a time T12 at which the CC terminal 63 is held at the first potential E1 is 40% of the unit time TU2. After the unit time TU2 has elapsed, the time T21 at which the CC terminal 63 is held at the second potential E2 becomes 70% of the unit time TU1, and the time T11 at which the CC terminal 63 is held at the first potential E1 is 30% of the unit time TU1, in the unit time TU1 again. The unit time TU1 and the unit time TU2 have the same length.

Figure 9:
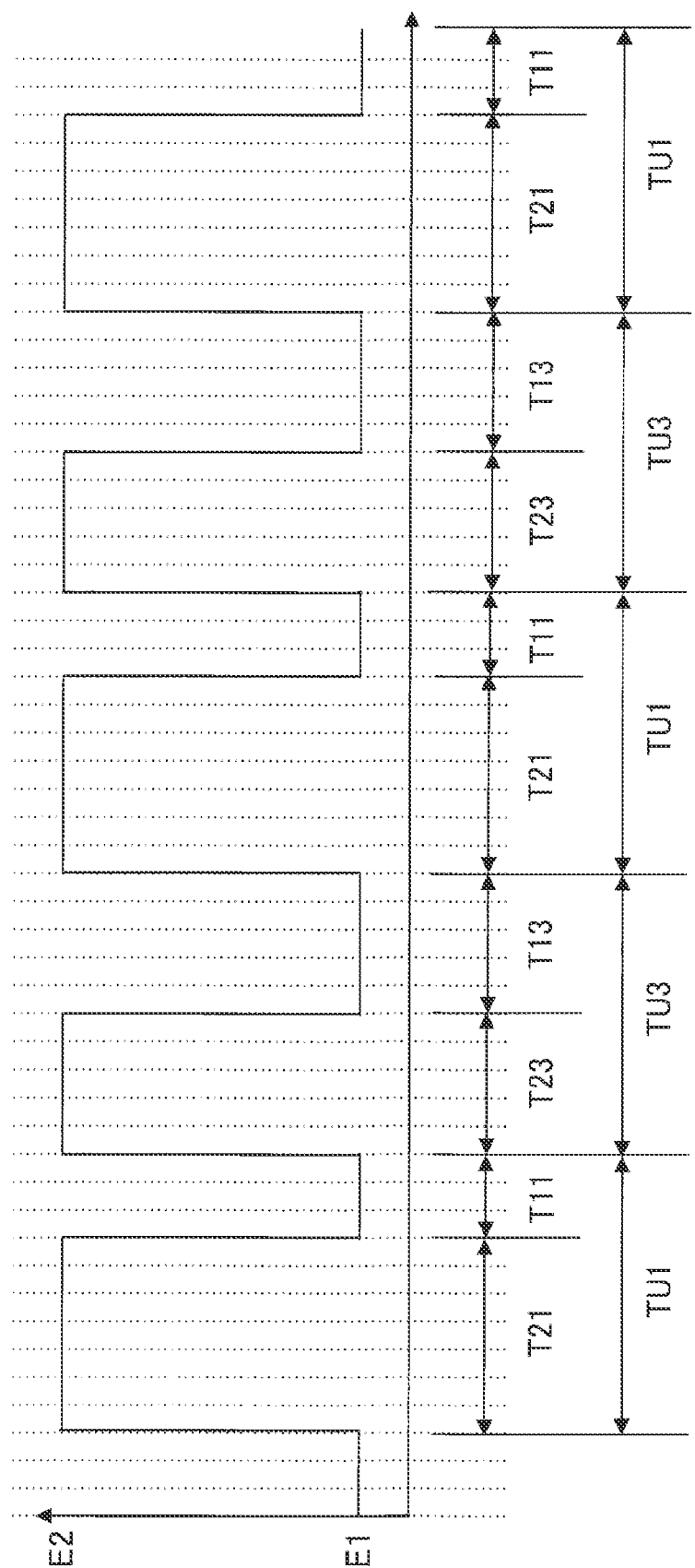
FIG. 9 is a graph illustrating switching of potentials in a CC terminal according to a third example.

FIG. 9 is a graph illustrating switching of potentials in the CC terminal 63 according to a third example. In FIG. 9, a horizontal axis represents passage of time, and a vertical axis represents a potential. In the CC terminal 63, the first potential E1 and the second potential E2 are repeated alternately. First, in the unit time TU1, the time T21 at which the CC terminal 63 is held at the second potential E2 is 70% of the unit time TU1, and the time T11 at which the CC terminal 63 is held at the first potential E1 is 30% of the unit time TU1. In a unit time TU3 after the unit time TU1, a time T23 at which the CC terminal 63 is held at the second potential E2 is a time that is 50% of the unit time TU3. In the unit time TU3, a time T13 at which the CC terminal 63 is held at the first potential E1 is a time that is 50% of the unit time TU3. After the unit time TU3 has elapsed, the time T21 at which the CC terminal 63 is held at the second potential E2 becomes 70% of the unit time TU1, and the time T11 held at the first potential E1 is 30% of the unit time TU1, in the unit time TU1 again. The unit time TU1 and the unit time TU3 have the same length. When the external device to be coupled is periodically and alternately switched between the first potential and the second potential, it is possible to prevent a switching period of the USB-Type-C interface 60 in the printer 10 and a switching period of the USB-Type-C interface in the external device from matching. When the switching period of the USB-Type-C interface 60 in the printer 10 matches the switching period of the external device to be coupled, the external device connected to the USB-Type-C interface 60 in the printer 10 may not be detected.

When the USB-Type-C interface 60 is a sink, the power can be received from the external device coupled to the USB-Type-C interface 60 via the $V_{BUS}$ terminal 61. In this case, the USB-Type-C interface in the external device operates as a source.

When the USB-Type-C interface 60 is a source, the power can be supplied from the external device coupled to the USB-Type-C interface 60 via the $V_{BUS}$ terminal 61. In this case, the USB-Type-C interface 60 in the external device operates as a sink.

In general, the printer 10 has a longer time in a standby state in which the printing operation is not performed than in a state in which the printing operation is performed. For that reason, a time at which the CC terminal 63 is held at the second potential E2 is longer than the time at which the CC terminal 63 is held at the first potential E1, which is preferable.

When the USB-Type-C interface 60 is a sink, the data signal can be received from the external device coupled to the USB-Type-C interface 60 via the D+/D− terminal 62. In this case, the USB-Type-C interface 60 of the external device operates as a source.

When the USB-Type-C interface 60 is a source, the data signal can be transmitted from the external device coupled to the USB-Type-C interface 60 via the D+/D− terminal 62. In this case, the USB-Type-C interface 60 in the external device operates as a sink.

Power delivery in the USB-Type-C interface 60 is a standard defined by USB Power Delivery (USB PD). In the USB-Type-C interface 60, information related to a voltage, a direction, and a function to be supplied or received is transmitted between the printer 10 and the external device before starting the power delivery. In the power delivery, the power can be supplied or received based on a contract between devices connected to each other. A port that supplies the power is a source, and a port that receives the power is a sink. The device that functions as a source is a provider, and the device that functions as a sink is a consumer. The USB-Type-C interface 60 can change the amount of power supplied depending on a situation, and can change the supply or reception of the power.

Next, an example of power delivery processing in the USB-Type-C interface 60 will be described. The source checks an ID of the USB-Type-C cable 90 coupled to the USB-Type-C interface 60 and confirms whether or not a current of exceeding 3 A can flow.

The source notifies a power profile adaptable to the sink. The sink requests a desired profile at a number from the adaptable power profile notified by the source. The source notifies that the requested power profile is adaptable. Thereafter, the $V_{BUS}$ terminal 61 is turned on, and the source starts to supply the power to the sink.

Figure 10:
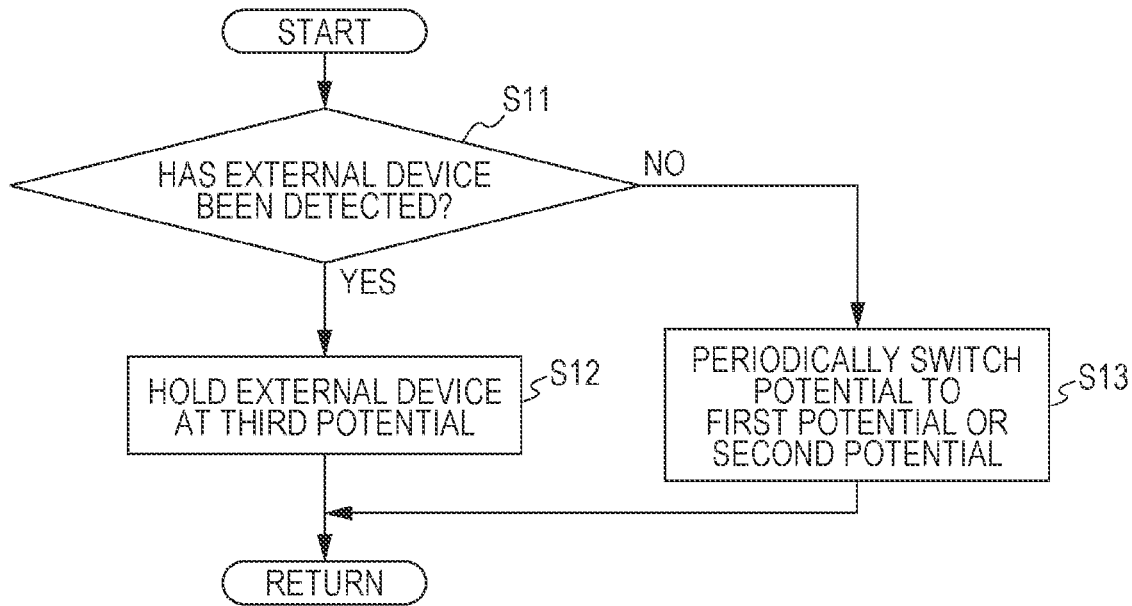
FIG. 10 is a flowchart illustrating a processing procedure in the printer.

Next, an example of processing in the printer 10 will be described with reference to FIG. 10. FIG. 10 is a flowchart illustrating a processing procedure executed by the printer 10. First, in step S11, the USB control section 53 determines whether or not the external device coupled to the USB-Type-C interface 60 has been detected. The USB control section 53 can detect the external device coupled to the USB-Type-C interface 60 based on identification information received by the CC terminal 63.

When the external device has been detected, the process proceeds to step S12, and the CC terminal 63 is held at the third potential. When the external device has not been detected, the process proceeds to step S13. When the external device is not coupled to the USB-Type-C interface 60, the process proceeds to step S13, and the CC terminal 63 is periodically and alternately switched between the first potential E1 and the second potential E2. After executing the process of step S12 or step S13, the process here is completed. When the external device is coupled to the USB-Type-C interface 60, held at the third potential, and then removed, the external device is not detected in step S11 again. In this case, the process proceeds to step S13, and the CC terminal 63 is periodically and alternately switched between the first potential E1 and the second potential E2.

Figure 11:
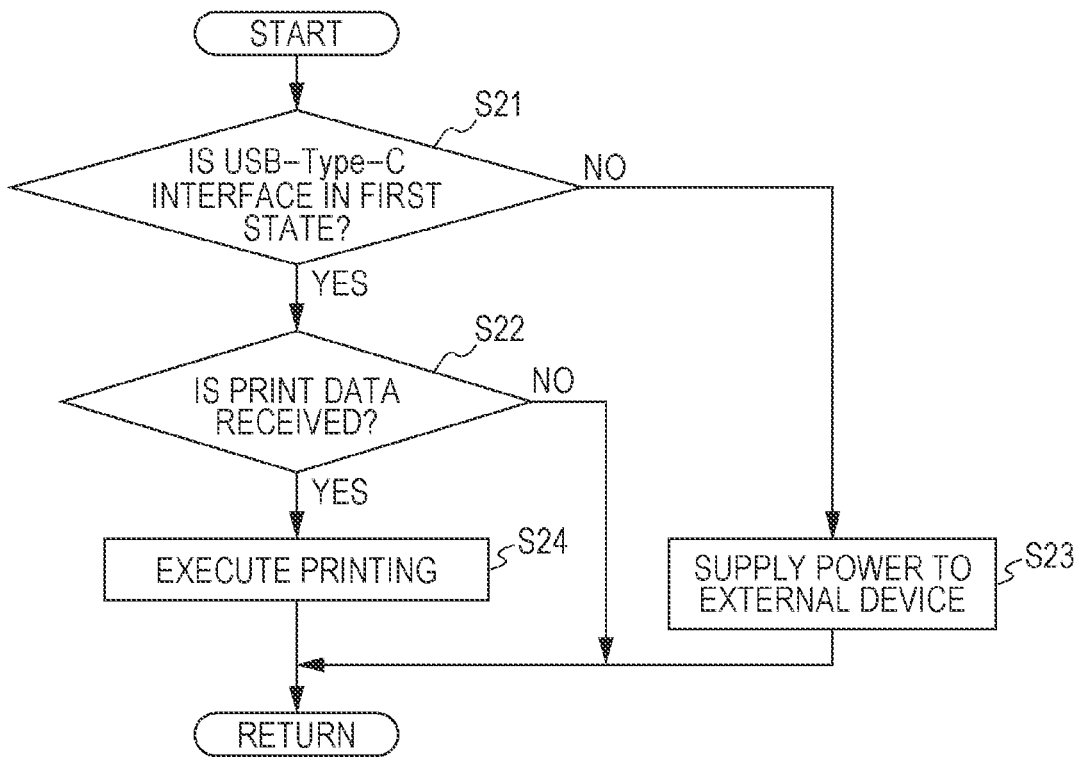
FIG. 11 is a flowchart illustrating another processing procedure in the printer.

Next, an example of processing in the printer 10 will be described with reference to FIG. 11. FIG. 11 is a flowchart illustrating a processing procedure executed by the printer 10. First, in step S21, the CPU 31 determines whether or not the USB-Type-C interface 60 is in the first state. For example, when the DFP 70 is coupled to the USB-Type-C interface 60 in a state in which the CC terminal 63 is at the first potential E1, the USB-Type-C interface 60 is in the first state. When the UFP 80 is coupled to the USB-Type-C interface 60 in a state in which the CC terminal 63 is at the second potential E2, the USB-Type-C interface 60 is in the second state.

When the USB-Type-C interface 60 is in the first state, the process proceeds to step S22, and when the USB-Type-C interface 60 is in the second state, the process proceeds to step S23. In step S22, the CPU 31 determines whether or not the print data is received from the external device coupled to the USB-Type-C interface 60. When the print data is received, the process proceeds to step S24, and when the print data is not received, the process here is completed.

The printer 10 can receive the print data transmitted from the external device via the D+/D− terminal 62. The print data may be communicated using wireless communication. In step S24, the CPU 31 transmits a command signal to the printing section 20 to execute printing based on the print data. After printing, the printer 10 completes the process here.

In step S23, the printer 10 supplies power to the external device coupled to the USB-Type-C interface 60 via the $V_{BUS}$ terminal 61. The power supply circuit 12 supplies the power according to a command from the CPU 31. The external device can operate with the power supplied from the printer 10. The battery built in the external device can be charged with the power supplied from the printer 10.

Figure 12:
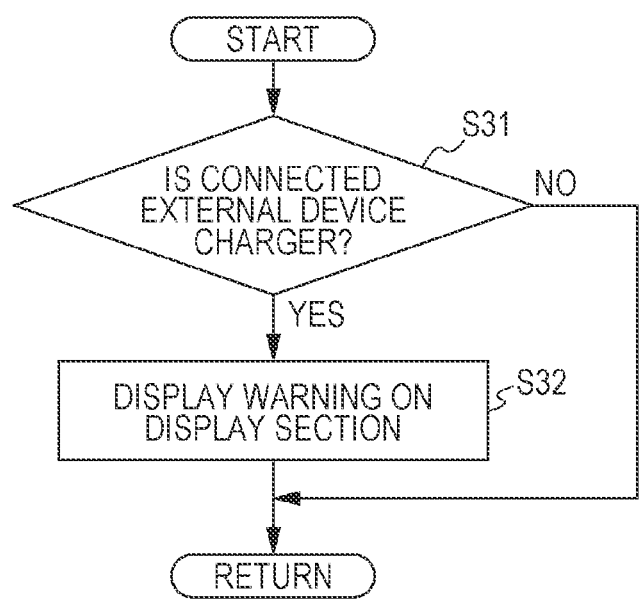
FIG. 12 is a flowchart illustrating still another processing procedure in the printer.

Next, an example of processing in the printer 10 will be described with reference to FIG. 12. FIG. 12 is a flowchart illustrating a processing procedure executed by the printer 10. First, in step S31, the CPU 31 determines whether or not the external device coupled to the USB-Type-C interface 60 is a charger. The CPU 31 can determine whether or not the external device is a charger based on the identification information of the external device received via the CC terminal 63.

When the external device coupled to the USB-Type-C interface 60 is a charger, the process proceeds to step S32. When the external device coupled to the USB-Type-C interface 60 is not a charger, the printer 10 completes the process here.

In step S32, the CPU 31 causes the display section 11 to display a warning. For example, the display section 11 displays a warning indicating that the printer 10 is not mounted with a battery module. As a result, the user can recognize that the printer 10 cannot be charged even if the charger is coupled to the printer 10.

Next, a case where the smart device 3 is coupled to the USB-Type-C interface 60 of the printer 10 will be described. The CC terminal 63 is periodically and alternately switched between the first potential E1 and the second potential E2, in a state in which no external device is coupled thereto. The USB-Type-C interface of the smart device 3 can operate as both the UFP 80 and the DFP 70. When the smart device 3 is recognized as the external device coupled to the USB-Type-C interface 60, the CC terminal 63 is at the third potential.

When the CC terminal 63 is at the second potential E2 and when the smart device 3 is recognized as the external device, the USB-Type-C interface of the smart device 3 can operate as the UFP 80, and the USB-Type-C interface 60 of the printer 10 can operate as the DFP 70.

The USB-Type-C interface 60, which operates as a source, can supply the power to the smart device 3. The power is supplied from the power supply circuit 12 to the smart device 3 via the $V_{BUS}$ terminal 61.

The USB-Type-C interface 60 of the printer 10 that operates as a source can transmit a data signal to the USB-Type-C interface of the smart device 3 that operates as a sink. The CPU 31 can transmit the data signal to the smart device 3 via the D+/D− terminal 62. For example, goods data acquired by the handy scanner 5 can be transmitted to the smart device 3. The printer 10 can transmit the data signal to the smart device 3 by using the wireless communication section 35. The smart device 3 can calculate the total price of goods based on the received data signal. The smart device 3 can display information on the display of the smart device 3 based on the received data signal.

When the CC terminal 63 is at the first potential E1 and when the smart device 3 is recognized as the external device, the USB-Type-C interface of the smart device 3 can operate as the DFP 70, and the USB-Type-C interface 60 of the printer 10 can operate as the UFP 80.

The USB-Type-C interface 60 of the printer 10 that operates as UFP 80 can receive a data signal from the USB-Type-C interface of the smart device 3 that operates the DFP 70. The CPU 31 can receive the data signal transmitted from the smart device 3 via the D+/D− terminal 62. For example, when printing a receipt, the smart device 3 can transmit print data to the printer 10. The CPU 31 can cause the printing section 20 to perform a printing operation to print the receipt based on the print data. The smart device 3 can transmit the print data to the printer 10 by using wireless communication. The printer 10 can receive the data signal using the wireless communication section 35.

When the smart device 3 is removed from the USB-Type-C interface 60, the CC terminal 63 is again periodically switched between the first potential E1 and the second potential E2.

When the external device is not coupled to the USB-Type-C interface 60 in the printer 10, the CC terminal 63 is periodically switched between the first potential E1 and the second potential E2. In this case, in the printer 10, the time T21 at which the CC terminal 63 is held at the second potential E2 is longer than the time T11 at which the CC terminal 63 is held at the first potential E1 in the unit time TU.

In a case where the external device is not coupled to the USB-Type-C interface 60, when a time at which the CC terminal 63 is at the second potential E2 is long, a percentage at which the USB-Type-C interface 60 of the printer 10 will be the DFP 70 is high when the external device is coupled to the USB-Type-C interface 60. In this case, the printer 10 can supply the power from the power supply circuit 12 to the external device. The printer 10 is likely to be held in a state in which the power can be easily supplied to the external device when the external device is not coupled to the printer 10. Since the external device coupled to the printer 10 is mainly supplied with the power in many cases, the setting of the USB-Type-C interface 60 suitable for the printer 10 can be realized.

As described above, the setting of the USB-Type-C interface 60 in the printer 10 is a DRP setting suitable for the printing apparatus.

Next, a case where the customer display 4 is coupled to the USB-Type-C interface 60 of the printer 10 will be described. The customer display 4 may be coupled to the USB-Type-C interface 60. The CC terminal 63 is periodically and alternately switched between the first potential E1 and the second potential E2, in a state in which no external device is coupled thereto. A USB-Type-C interface of the customer display 4 operates only as the UFP 80. The USB-Type-C interface of the customer display 4 does not operate as the DFP 70. When the customer display 4 is recognized as the external device coupled to the USB-Type-C interface 60, the CC terminal 63 is at the third potential.

When the CC terminal 63 is at the second potential E2 and the customer display 4 is coupled to the USB-Type-C interface 60, the USB-Type-C interface 60 operates as the DFP 70. The USB-Type-C interface 60, which operates as a source, can supply the power to the customer display 4. The power is supplied from the power supply circuit 12 to the customer display 4 via the $V_{BUS}$ terminal 61.

The USB-Type-C interface 60 of the printer 10 that operates as a source can transmit a data signal to the USB-Type-C interface of the customer display 4 that operates as a sink. The CPU 31 can transmit the data signal to the customer display 4 via the D+/D− terminal 62. For example, goods data acquired by the handy scanner 5 can be transmitted to the customer display 4. The customer display 4 can display the price of goods or the like based on the received data signal. As such, the customer display 4 can be connected to the printer 10.

Next, a case where the handy scanner 5 is coupled to the USB-Type-C interface 60 of the printer 10 will be described. The handy scanner 5 may be coupled to the USB-Type-C interface 60. The CC terminal 63 is periodically and alternately switched between the first potential E1 and the second potential E2, in a state in which no external device is coupled thereto. A USB-Type-C interface of the handy scanner 5 operates as the DFP 70. When the handy scanner 5 is recognized as the external device coupled to the USB-Type-C interface 60, the CC terminal 63 is at the third potential.

When the CC terminal 63 is at the second potential E2 and the handy scanner 5 is coupled to the USB-Type-C interface 60, the USB-Type-C interface 60 of the printer 10 operates as the DFP 70. The printer 10 that operates as a source can supply the power to the handy scanner 5. The power is supplied from the power supply circuit 12 to the handy scanner 5 via the $V_{BUS}$ terminal 61.

The handy scanner 5 operates with power supplied from the printer 10. The handy scanner 5 can read a barcode attached to the goods and transmit the acquired data to the printer 10. The printer 10 can transmit the acquired data to the smart device 3 and the customer display 4. As such, the handy scanner 5 is coupled to the printer 10.

Figure 13:
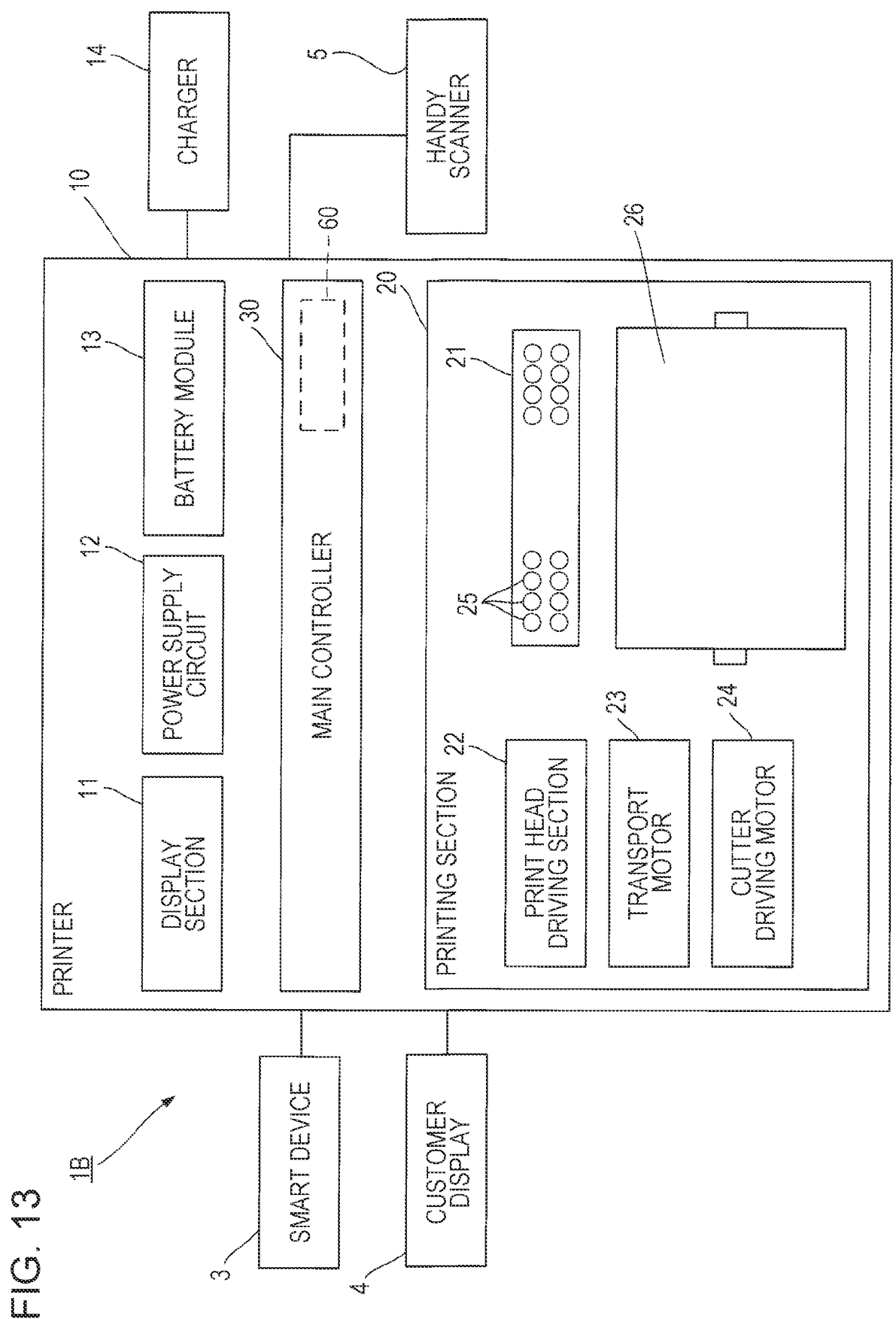
FIG. 13 is a block diagram illustrating a POS system according to a second embodiment.

Next, a POS system 1B according to s second embodiment will be described. FIG. 13 is a block diagram illustrating the POS system 1B according to the second embodiment. The difference between the POS system 1B according to the second embodiment and the POS system 1 according to the first embodiment is that a process is different in a case in which the printer 10 is mounted with the battery module 13 and the charger 14 is coupled to the USB-Type-C interface 60. In the state illustrated in FIG. 13, the charger 14 is coupled to the printer 10. In the description of the second embodiment, the same description as that of the first embodiment will be omitted.

The printer 10 includes the battery module 13. The battery module 13 is a storage battery that can be charged and discharged. The battery module 13 is electrically coupled to the power supply circuit 12. The power supply circuit 12 can supply the power output from the battery module 13 to the display section 11, the printing section 20, and the main controller 30.

The charger 14 is, for example, a portable mobile battery. The charger 14 is coupled to the USB-Type-C interface 60.

Figure 14:
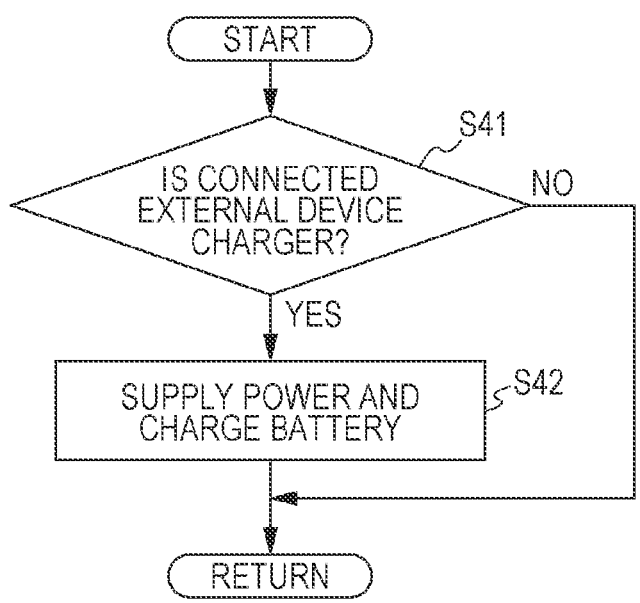
FIG. 14 is a flowchart illustrating a processing procedure in a printer.

FIG. 14 is a flowchart illustrating a processing procedure executed by the printer 10. First, in step S41, the CPU 31 determines whether or not the external device coupled to the USB-Type-C interface 60 is the charger 14. The CPU 31 can determine whether or not the external device is the charger 14 based on the identification information of the external device received via the CC terminal 63.

When the external device coupled to the USB-Type-C interface 60 is the charger 14, the process proceeds to step S42. When the external device coupled to the USB-Type-C interface 60 is not the charger 14, the printer 10 completes the process here.

In step S42, the printer 10 receives the power from the charger 14, and the power is charged to the battery module 13. The power charged in the battery module 13 can be used in the display section 11, the printing section 20, and the main controller 30 via the power supply circuit 12. The printer 10 can supply the power from the battery module 13 to the external device, such as the smart device 3, via the $V_{BUS}$ terminal 61.

The printer 10 according to the second embodiment also has the same effect as the printer 10 according to the first embodiment. Since the printer 10 of the second embodiment includes the battery module 13, the power can be supplied from the charger 14 coupled to the USB-Type-C interface 60 and charged to the battery module 13.

The above-described embodiments are merely representative forms of the present disclosure. The present disclosure is not limited to the above-described embodiments, and various modifications and additions can be made in so far as they do not depart from the spirit of the present disclosure.

In the above-described embodiment, a part of the processing executed by the CPU 31 may be executed by another control section such as the USB control section 53. Similarly, a part of the processing executed by the USB control section 53 may be executed by the CPU 31.

The printer 10 includes a printing element which is a heat generating element in the above-described embodiments, but the printer 10 is not limited to one including the heat generating element, and may be a printer including other printing elements. The printing apparatus may be an ink jet printer including a piezoelectric element as a printing element and ejecting ink onto a medium. The printing apparatus may be a dot impact printer or another printer such as a laser printer.

The POS system 1 including the printer 10 has been described in the above-described embodiments, but the use of the printer 10 is not limited to the POS system 1. The printing apparatus of the present disclosure may be a home printing apparatus, a business printing apparatus, or a printing apparatus used for other purposes.

The external device coupled to the printing apparatus is not limited to the smart device 3, the customer display 4, the handy scanner 5, and the charger 14, and may be other external devices. The external device may be, for example, another external device such as an audio output device, an image display device, a game terminal, a smartwatch, a scanner, a card reader, or an input device.

What is claimed is:

1. A printing apparatus comprising:
   a printing section performing printing on a medium;
   a power supply circuit supplying power to the printing section;
   a control circuit controlling the printing section and the power supply circuit; and
   a USB-Type-C interface configured to couple an external device and perform switching to a first state in which a printing operation is executed by the printing section in response to a request from the external device or a second state in which the power is supplied from the power supply circuit to the external device, wherein
   the USB-Type-C interface includes a state identification terminal held at a first potential indicating that the USB-Type-C interface is coupled in the first state or a second potential indicating that the USB-Type-C interface is coupled in the second state,
   the control circuit determines whether the external device is being coupled to the USB-Type-C interface,
   the control circuit starts controlling the state identification terminal to start repetitions of switching periods each including first and second unit times in each of which switching between the first potential and the second potential is performed, in response to the control circuit determining that the external device is not being coupled to the USB-Type-C interface,
   during the first and second unit times, a time at which the state identification terminal is held at the second potential is longer than or equal to a time at which the state identification terminal is held at the first potential, and
   ratios between the time at which the state identification terminal is held at the second potential and the time at which the state identification terminal is held at the first potential during the first and second unit times are different from each other.

2. The printing apparatus according to claim 1, wherein when the USB-Type-C interface is in the first state, the power is supplied from the external device via the power input/output terminal, and when the USB-Type-C interface is in the second state, the power is supplied to the external device via the power input/output terminal.

3. The printing apparatus according to claim 1, wherein the USB-Type-C interface includes a data transmission/reception terminal, when the USB-Type-C interface is in the first state, a data signal is received from the external device via the data transmission/reception terminal, and when the USB-Type-C interface is in the second state, the data signal is transmitted to the external device via the data transmission/reception terminal.

4. The printing apparatus according to claim 1, wherein when data for requesting the printing operation is received from the external device coupled to the USB-Type-C interface, and the printing operation is executed by the printing section, the state identification terminal is held at a third potential different from the first potential and the second potential.

5. The printing apparatus according to claim 4, wherein when the external device is coupled to the USB-Type-C interface and removed after the state identification terminal is held at the third potential, the state identification terminal is periodically switched between the first potential and the second potential.

6. The printing apparatus according to claim 4, wherein a battery module coupled to the power supply circuit is mounted, and when the external device coupled to the USB-Type-C interface is a charger, the state identification terminal is held at the third potential, and the battery module is charged by supplying the power from the external device.

7. The printing apparatus according to claim 1, wherein a battery module is not mounted, a display section is provided, and when the external device coupled to the USB-Type-C interface is a charger, the state identification terminal is held at the third potential, and the display section displays a warning.

8. The printing apparatus according to claim 1, wherein the ratios between the time at which the state identification terminal is held at the second potential and the time at which the state identification terminal is held at the first potential during the first and second unit times are changeable between 7:3 and 5:5.

9. The printing apparatus according to claim 1, further comprising:

a wireless communication section receiving a data signal that is output from the external device coupled to the USB-Type-C interface.

10. The printing apparatus according to claim 1, wherein the control circuit continues the controlling of the state identification terminal to continue the repetitions of the switching periods until the control circuit determines that the external device is being coupled to the USB-Type-C interface.

* * * * *